July 2, 1963  E. E. LOVELL  3,095,595
WINDSHIELD CLEANER CONTROL DEVICE
Filed Dec. 16, 1960
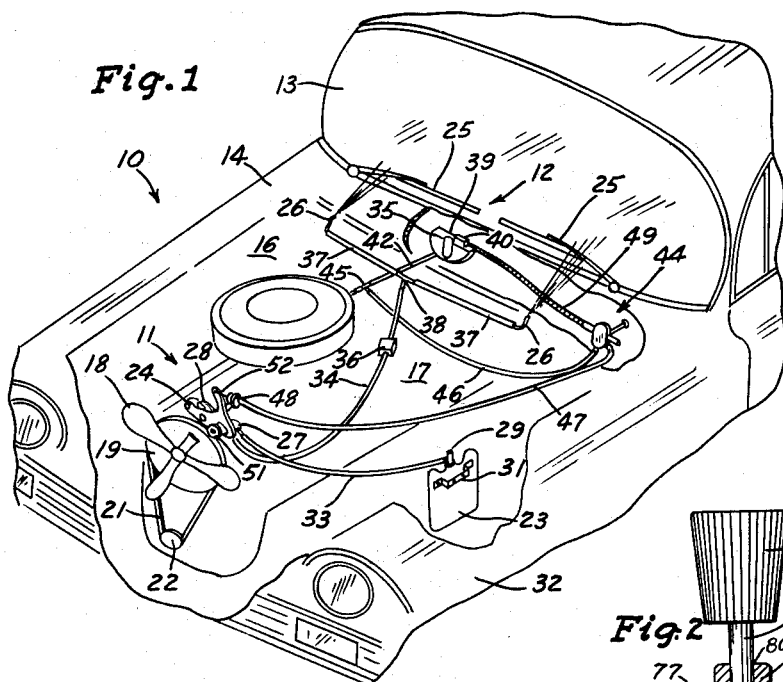
INVENTOR
ERNEST E. LOVELL
BY
Lowell & Henderson
ATTORNEYS

United States Patent Office 3,095,595
Patented July 2, 1963

3,095,595
WINDSHIELD CLEANER CONTROL DEVICE
Ernest E. Lovell, Detroit, Mich., assignor to The Delman Company, Cookeville, Tenn., a corporation of Tennessee
Filed Dec. 16, 1960, Ser. No. 76,289
2 Claims. (Cl. 15—250.01)

This invention relates generally to a windshield clearing apparatus and in particular to a control device providing for the selective independent or concurrent operation of the wiper and washer systems comprising the apparatus.

An object of this invention is to provide an improved control device for the cooperative or independent operation of the wiper and washer systems of a windshield clearing apparatus.

Another object of this invention is to provide a common control device for the independent power units of the wiper and washer systems of a windshield clearing apparatus, wherein rotary movement of a single manipulating member of the device controls the operation of a windshield wiper, and axial movement of the member controls the spraying of a liquid onto the windshield.

A further object of this invention is the provision of a common control device for the independent power units of the wiper and washer systems of a windshield clearing apparatus, wherein a valve member of resilient material is linearly movable to a sealing position for rendering operative the power unit for actuating the washer system, and further wherein when the control device is rotated to render operative the power unit for actuating the wiper system, the valve member maintains the sealing position while being rotated.

Yet another object of this invention is to provide a control device for regulating the supply of a fluid under pressure to a pressure responsive actuator wherein a single valve member of a resilient material is linearly movable within a fluid chamber means to, in one moved position, communicate a fluid pressure inlet for the chamber with the actuator and close a fluid bleed means from said chamber to the atmosphere, and in a second position to close the fluid pressure inlet and open the fluid pressure bleed means.

Another object of this invention is to provide a control device for attaining the above mentioned objects which is economical to manufacture, and effective in service and operation.

These objects and other advantages will become readily apparent by reference to the following description when taken in conjunction with the accompanying drawings, wherein:

FIG. 1 is a fragmentary perspective view of a vehicle showing the invention in assembled relation therewith, with some parts broken away for the purpose of clarity;

FIG. 2 is an enlarged detail sectional view showing the control device of this invention in an inoperative position;

FIG. 3 is a sectional view taken along the line 3—3 in FIG. 2;

FIG. 4 is a view similar to FIG. 2 and wherein the control device has been axially and rotatably moved to be placed in an operative position; and FIG. 5 is a sectional view taken along the line 5—5 in FIG. 2.

With reference to the drawings, there is illustrated in FIG. 1 a windshield clearing apparatus as applied to an automobile 10 which includes a windshield washer system and a windshield wiper system designated generally as 11 and 12, respectively. The washer system 11 functions as a liquid applying means for cooperation with the wiper system 12. The vehicle is illustrated as having a windshield 13 and an engine cowl 14 extended forwardly of the windshield. The automobile has the usual engine compartment 16 in which is mounted the engine 17, a water-cooling fan 18, a pulley 19, and a fan belt 21 driven off an engine crankshaft pulley 22.

The windshield washer system 11 includes a fluid reservoir 23 from which fluid is supplied to a pair of nozzles 26 for directing the fluid against the windshield 13 and into the path of a pair of wipers 25. Fluid pressure is applied by a power unit 24 which includes a rotary pump 27 interconnected between the reservoir 23 and the nozzles 26. The pump 27 is pivotally mounted on a mounting unit 28 carried on the front of the engine 17 adjacent the pulley 19.

The fluid reservoir 23 is shown as being a flexible bag having a filler opening at the top and a closure cap 29 for the opening. The reservoir 23 is hung from a bracket 31 which is secured on the inside of a fender 32 of the vehicle 10 so as to be within the engine compartment 16. A fluid transmitting conduit 33 is connected between the reservoir 23 and the pump 27 to enable the pump upon operation to withdraw fluid from the reservoir 23, and then force the fluid under pressure through a conduit 34 to the nozzles 26.

The nozzles 26 of the fluid applying or power unit 24, are shown as being mounted to the automobile directly in front of the cowl 14 in a spaced manner so that each nozzle 26 services one side of the windshield 13. The nozzles are of a known type embodying the jet principle so as to emit and direct a high pressure stream of fluid against the windshield 13 and into the path of a respective wiper 25. A fluid conduit 37 connects each nozzle 26 to a T-fitting 38, the conduit 34 being attached to the stem of the fitting 38. A one-way check valve 36 is interposed in the conduit 34 for the purpose of permitting fluid to flow through the conduit to the nozzles 26, but preventing a backward or reverse flow therethrough toward the pump 27.

The wiper system 12 includes the wipers 25 and a power unit 35 shown here as being a conventional suction-operated wiper motor 39 which has a reciprocally movable actuating or control valve 40 adapted for on-off control of the motor 39. A hose 42 connects the wiper motor 39 in the usual manner with the vehicle engine 17 the intake manifold of which is utilized as a source of suction. Obviously a mechanical vacuum pump or the like may replace the intake manifold as a source of partial vacuum, and if desired a vacuum reservoir may be interposed between the source of subatmospheric pressure and the devices to be operated therefrom.

For the purpose of controlling and coordinating the operation of the washer and wiper systems 11 and 12, respectively, a common control unit is provided. The control unit comprises a control valve device 44 (FIG. 1) mounted on the vehicle dashboard (not shown) and connected by a conduit 46 to a T-fitting 45 interposed in the main suction hose 42. The control unit also includes a conduit 47 leading from the valve device 44 to an actuating device 48 for the power unit 24, and includes further a Bowden wire 49 operatively connected between the valve device 44 and the valve 40 for the wiper motor 39. As will be described hereinafter, the control unit is adapted to selectively render the wiper motor 39 operative or inoperative independently of or in combination with the washer pump 27 and vice versa. Both control actions by the control unit result from a regulation of the respective actuating means for the motor 39 and the pump 27, namely the control valve 40 and the actuating device 48.

The device 48 for actuating the pump 27 of the power unit 24 for the washer system 11, is described in the copending application of Edmond F. Webb bearing Serial No. 733,638, now Patent No. 3,000,033, filed May 7, 1958. For details of the power unit 24 not found herein, reference may be had to the foregoing application. Briefly, the power unit pump 27 (FIG. 1) is a rotary gear type pivotally mounted on the mounting bracket 28, and has a driving wheel 51 normally in spaced relation from the fan belt 21. The actuating device 48 is suction operated via the conduit 47 and includes an actuating wire 52 operable, upon the application of a subatmospheric pressure to the device 48, to cause the pump driving wheel 51 to be pivoted into driving engagement with the fan belt 21. The operation of the pump 47 resulting from the fan belt engagement causes fluid under pressure to be transmitted through the conduit 34 to the nozzles 26, and continues until the suction in the conduits 46 and 47 is interrupted by action of the valve device 44.

Referring particularly to FIGS. 2–5, inclusive, the valve device 44 includes a housing 53 which acts as a bearing for a manipulating element or control shaft 54 supported therein for both rotational and linear movement. One end 56 of the shaft 54 protrudes from the housing 53 and has a control knob 57 attached thereto. Within the housing 53, a pinion gear 58 is attached to the shaft 54 and is in continuous engagement with a rack 59 (FIG. 3) guidably supported within a portion 61 of the housing 53. The rack 59 is affixed to the end of the Bowden wire cable 49′, thus on rotation of the control knob 57, the pinion gear 58 is rotated to in turn linearly move the rack 59 to place the wiper motor control valve 40 (FIG. 1) in either an operative or inoperative position.

Immediately adjacent the pinion gear 58 is a stop disc 62 (FIG. 2) secured to the shaft 54 concentrically with the gear 58 and adapted upon axial movement of the shaft inwardly of the housing 53 to engage a valve seat 63 secured to the housing 53. The shaft 54 has an axial bleed groove 64 extended through the valve seat 63 and open to the atmosphere via a pair of cavities 79 and 81, and a bore 80 formed in the housing 53 for the shaft 54. The respective diameters of the cavities 79 and 81 are sufficiently large so that the disc 62 and the pinion 58 are reciprocally movable in the cavities while permitting air under atmospheric pressure to pass therethrough.

Mounted on the shaft 54 and in releasable engagement with a collar 66 at its lower end, is a valve member 67 of a soft resilient material, such as rubber. The valve member 67 is of a cylindrical shape, having opposed flat parallel faces or surfaces 68 and 69, and a recess 70 formed therein so that by distorting the recess, the collar end of the shaft 54 can be forced therein to support the valve member on the shaft 54.

The valve member 67 is disposed within a fluid pressure chamber 71 (FIG. 2) formed within a fitting 72 secured to the housing 53. The fitting 72 has an inlet opening 73 connected to the conduit 46, and an outlet opening 74 connected by the conduit 47 to the fluid pump actuating device 48. Additionally, the fitting has a bleed passage 76 (FIG. 5) formed along one side thereof leading via the outlet opening 74 and the conduit 47 to the actuating device 48.

In the position of the valve device 44 in FIG. 2, neither the wiper motor 39 (FIG. 1) nor the washer pump 27 are operating, due to the positions of the rack 59 and of the valve member 67. As illustrated, the lower surface 69 of the valve member 67 is seated so as to close the inlet opening 73 to shut off the washer pump device 48 from the vacuum source. The valve device 44 is retained in this position by means of a coil spring 77 mounted about the shaft 54 between the housing 53 and the pinion gear 58. However, as stated before, by merely rotating the knob 57, the pinion and rack 59 coact to render the wiper motor control valve 40 (FIG. 1) operative to actuate the wiper motor 39.

To connect the conduit 46 (FIG. 1) from the main suction hose 42 to the conduit 47 for the washer system power unit 24, the control knob 57 (FIG. 4) is pulled outwardly from the valve housing 53 against the bias of the coil spring 77. This axial movement of the shaft 54 unseats the lower surface 69 of the valve member 67 from its position closing the inlet opening 73, and seats the upper surface 68 against the adjacent surface 78 of the valve seat 63. In this sealing position, the valve member 67 closes off the bleed groove 64 in the control shaft 54 from the bleed passage 76 in the housing 53 leading from the outlet opening 74. At the same time, the inlet and outlet openings 73 and 74, respectively, are opened to each other so that a continuous fluid passage is open from the source of vacuum to the device 48 for the washer system power unit pump 27 (FIG. 1).

It is thus readily seen that axial movement of the control shaft 54 selectively connects and disconnects the conduits 46 and 47 for rendering the pump 27 for the cleaning liquid respectively operative and inoperative. Referring again to FIG. 4, while the control shaft 54 is retained in its "pulled-out" position to operate the washer system, the wiper system can be readily actuated to oscillate the wipers 25 by a rotation of the control knob 57. As the pinion gear 58 remains engaged with the rack 59 during axial movement of the shaft 54, rotation of the shaft by the control knob 57 effects a longitudinal pulling movement of the Bowden wire 49 on the wiper motor control valve 40 to shut off the wiper motor 39. Importantly, during the rotation of the shaft 54, the resilient valve member 67 maintains its sealing position against the valve seat 63 (FIG. 4).

To render the washer system inoperative or inactive, the control knob 57 is merely released, whereby the coil spring 77 forces the control shaft 54 inwardly of the valve device housing 53. The valve member 67 is unseated from the valve seat 63 and re-seated over the inlet opening 73 to disconnect the conduit 47 from the conduit 46 and cut off the subatmospheric pressure source from the actuating device 48. By so moving, the valve member 67 opens the outlet conduit 47 and the bleed passage 76 to the bleed groove 64 now extended into the chamber 71. As the bleed groove 64 is open to the atmosphere through the cavity 79 and the bore 81 of the housing 53, the vacuum in the actuating device 48 is relieved and the pump driving wheel 51 (FIG. 1) withdrawn from contact with the fan belt 21.

In this released position of the control knob 57 from the FIG. 4 applied position thereof, as the rack and pinion remain stationary, the pinion 58 merely moving axially, the wiper system remains active; however, by reversely rotating the control knob 57 to linearly retract the rack 59 to its FIG. 2 position, the wiper motor valve 40 is positioned to shut off the wiper motor 39.

In summation, a control device is disclosed for selectively controlling the combined or independent operation of the wiper and washer systems of a windshield clearing apparatus, and which control device includes a resilient valve member adapted to be moved to two positions wherein opposed faces of the valve member each selectively effects a fluid sealing function.

Although a preferred embodiment of the invention has been disclosed herein, various modifications and alterations can be made without departing from the scope of the invention as defined by the appended claims.

I claim:
1. In a windshield cleaning system, wiper means and a washer means, a power unit associated with each of said means for operating the same, a common control means for said power units comprising a bearing and an elongated manipulating element supported thereby for relative axial and rotatable movement, a first actuating means operated by said element upon rotatable movement thereof for rendering said wiper means power unit operative and inoperative, a second actuating means operated by said element upon axial movement thereof for rendering such washer means power unit operative and inoperative, including a fluid chamber means secured to said bearing, said manipulating element having an end portion projected from said bearing into said chamber means, said chamber means having an inlet and a fluid bleed means arranged opposite each other at positions spaced axially of said element, an outlet for said chamber means, said inlet being connectible with a source of fluid pressure and said outlet being connectible with said second actuating means, a one piece valve member formed of a resilient material and mounted on the projected end portion of said manipulating element so as to constitute an extension therefor, said valve member being of a greater diameter than said end portion so that on axial movement of said element in one direction to a first position, one end face of said valve member acts to close said inlet whereby said outlet and bleed means are in fluid communication, and on axial movement of said element in an opposite direction to a second position the opposite end face of said valve member acts to close said bleed means whereby said inlet and outlet are in fluid communication, and means for yieldably holding said element in said first position therefor.

2. A valve means for controlling the operation of an actuator for a power unit comprising a fluid chamber means, an axially movable elongated control member having a portion projected into said chamber means from one end thereof, means attached to said chamber means for supporting said control member for axial movement, a fluid bleed means in said one end of the chamber means, a fluid inlet in the opposite end of said chamber means, a fluid outlet in a side of said chamber means, said inlet being connectible with a source of fluid pressure and said outlet being connectible with said actuator, a one piece valve member formed of a resilient material mounted on said end portion so as to constitute an axial extension therefor, said valve member being of an enlarged diameter relative to said projected portion so that on axial movement of said control member in one direction to a first position, one end face of said valve member acts to close said inlet whereby said outlet and bleed means are in fluid communication, and on axial movement of said control member in an opposite direction to a second position the opposite end face of said valve member acts to close said bleed means whereby said inlet and outlet are in fluid communication, and means for yieldably holding said control member in said first position therefor.

References Cited in the file of this patent

UNITED STATES PATENTS

| | | |
|---|---|---|
| 2,323,470 | Horton et al. | July 6, 1943 |
| 2,632,471 | Horton | Mar. 24, 1953 |
| 2,722,455 | Oishei | Nov. 1, 1955 |